United States Patent [19]
Staffin et al.

[11] 3,779,181
[45] Dec. 18, 1973

[54] FLUID BED DRYER AND HEAT EXCHANGE SYSTEM

[75] Inventors: Herbert K. Staffin; Robert Staffin, both of Colonia, N.J.

[73] Assignee: AWT Systems, Inc., Wilmington, Del.

[22] Filed: Aug. 30, 1972

[21] Appl. No.: 284,705

[52] U.S. Cl. ............................... 110/7 R, 34/37 R
[51] Int. Cl. .............................................. F23b 1/38
[58] Field of Search ............... 110/7 R, 8 R; 34/10, 34/57 R, 57 A; 432/15, 58

[56] References Cited
UNITED STATES PATENTS

| | | | |
|---|---|---|---|
| 3,552,334 | 1/1971 | Springer | 110/8 R |
| 3,472,186 | 10/1969 | Osterman | 110/8 R |
| 3,319,587 | 5/1967 | Albertson et al. | 110/8 R |
| 3,319,586 | 5/1967 | Albertson et al. | 110/8 R |
| 3,310,882 | 3/1967 | Barber et al. | 34/57 R X |
| 3,250,016 | 5/1966 | Agarwal | 34/57 R X |
| 3,218,995 | 11/1965 | Yoshihara et al. | 110/7 R |
| 3,087,253 | 4/1963 | Wulf | 34/57 A X |

Primary Examiner—William F. O'Dea
Assistant Examiner—William C. Anderson
Attorney—Finnegan, Henderson & Farabou

[57] ABSTRACT

A fluid bed dryer comprising a drying chamber and a heating jacket contiguous with a drying chamber. The drying chamber and the heating jacket are each adapted to contain a bed of fluidizable particulate heat transfer material and each has a fluidizing gas inlet and an exhaust gas outlet. The drying chamber also has a feed inlet and a feed outlet. The fluid bed dryer may be used in a heat exchange system in combination with means for conveying a slurry comprising liquid and combustible waste solids to the feed inlet of the drying chamber of the fluid bed dryer; a reactor having a feed inlet, a reaction section, and a vapor exhaust port; conveyor means for transferring solids from the feed outlet of the drying chamber to the feed inlet of the reactor; conduit means connecting the vapor exhaust port of the reactor to the fluidizing gas inlet of the heating jacket of the dryer; and means for providing fluidizing gas to the fluidizing gas inlet of the drying chamber.

15 Claims, 5 Drawing Figures

FLUID BED DRYER AND HEAT EXCHANGE SYSTEM

This invention relates to an efficient waste disposal process in which gases resulting from incineration or pyrolysis of combustible waste materials in the form of a slurry is used to partially dry the incoming feed to the incineration or pyrolysis reactor. More particularly, this invention relates to a novel heat exchange system for using reactor off-gases to heat a dryer utilizing a fluidized bed to transfer heat to the combustible waste material being dried. This invention also relates to a novel fluid bed dryer.

The economic disposal of combustible waste materials is of national importance. Typical examples of combustible waste materials include paunch manure, which is a by-product of the meat packing industry, sludge from domestic waste treatment plants, and the like. Many of these combustible waste materials contain high concentrations of water and oftentimes are present in the form of an aqueous slurry when ready for disposition.

Combustible waste materials in the form of a slurry or sludge are commonly disposed of by incineration. The major obstacle to the economical incineration of aqueous slurries or sludges is the presence of the liquid phase which necessitates a considerable input of energy to vaporize the liquid phase before combustion of solids can proceed. The necessity to remove or substantially reduce the liquid phase in the slurry prior to incineration has led to the development of various process schemes capable of removing the liquid phase from the slurry or sludge by such means as centrifugation, and filtration. The object behind such preliminary steps is to effect removal of as much of the liquid phase as possible prior to incineration so that fuel requirements for operation of the incinerator will be substantially reduced. Fuel requirements can be eliminated when the heat of combustion of the waste materials is sufficient to provide the energy requirements for the process employed.

Another method for reducing the amount of the liquid phase of a slurry feed has been tried with some degree of success. This method comprises drying the slurry by utilization of combustion gases from incineration of dried solids from the slurry as the heat source for vaporizing the aqueous phase of the slurry. In this method, as heretofore practiced, hot incineration gases are heat exchanged with an incoming slurry of combustible waste material. The heat transfer coefficient achieved between the incinerator off gases and the slurry with this method is relatively low because there is a gas phase heat transfer coefficient on one side of the heat exchanger wall. In addition to the low heat transfer coefficient, high temperature incinerator gases applied on one side of the heat exchange wall with a slurry of combustible waste material on the opposite side of said wall frequently results in fouling of the heat transfer surface on the slurry side of the heat exchanger.

Accordingly, it is an object of this invention to provide an improved heat exchange system which permits the economic disposal of a slurry of combustible waste materials by drying the combustible waste materials prior to reaction (i.e., incineration or pyrolysis) utilizing off gases from the reactor in which the combustible materials are reacted to effect said drying. It is a further object of this invention to provide a novel fluidized bed dryer for drying of slurries of material in which the heating jacket for the dryer is contiguous with the drying chamber of the dryer and in which jacket a bed of particulate heat transfer material is adapted to be fluidized by heated gases.

The fluid bed dryer of the present invention comprises a drying chamber and a heating jacket contiguous with the drying chamber. The drying chamber and the heating jacket are each adapted to contain a bed of fluidizable particulate heat transfer material positioned in their lower portions and both the drying chamber and the heating jeacket have a fluid gas inlet and an exhaust gas outlet. The drying chamber also has a feed inlet and a feed outlet. Preferably, the feed outlet is vertically spaced from the feed inlet and a conveyor means extends from the feed outlet into the drying chamber for transferring dried solids from the drying chamber to the feed outlet.

The heat exchange system of the present invention comprises in combination: (a) a fluid bed dryer such as described above, (b) means for conveying a slurry comprising liquid and combustible waste solids into the drying chamber of said dryer, (c) a reactor or incinerator have a feed inlet, a reaction section, and a vapor exhaust port, (d) conveyor means for transferring solids from the fluid bed dryer feed outlet to the feed inlet of said reactor, (e) conduit means connecting the vapor exhaust port of the reactor to the gas inlet of the heating jacket of the fluid bed dryer, and (f) means for providing fluidizing gas to both the reactor and the drying chamber of the fluid bed dryer.

The heat exchange system may include a conduit communicatively connecting the exhaust gas outlet of the drying chamber of the fluid bed dryer with the reactor. The reactor or incinerator is preferably a fluidized bed reactor. However, other types of reactors, such as a raking arm furnace, may also be used.

The heat exchange system of this invention is more fully described with reference to the following detailed description and drawings of preferred embodiments. In the drawings, like numbers refer to like parts where applicable.

Figure 1:
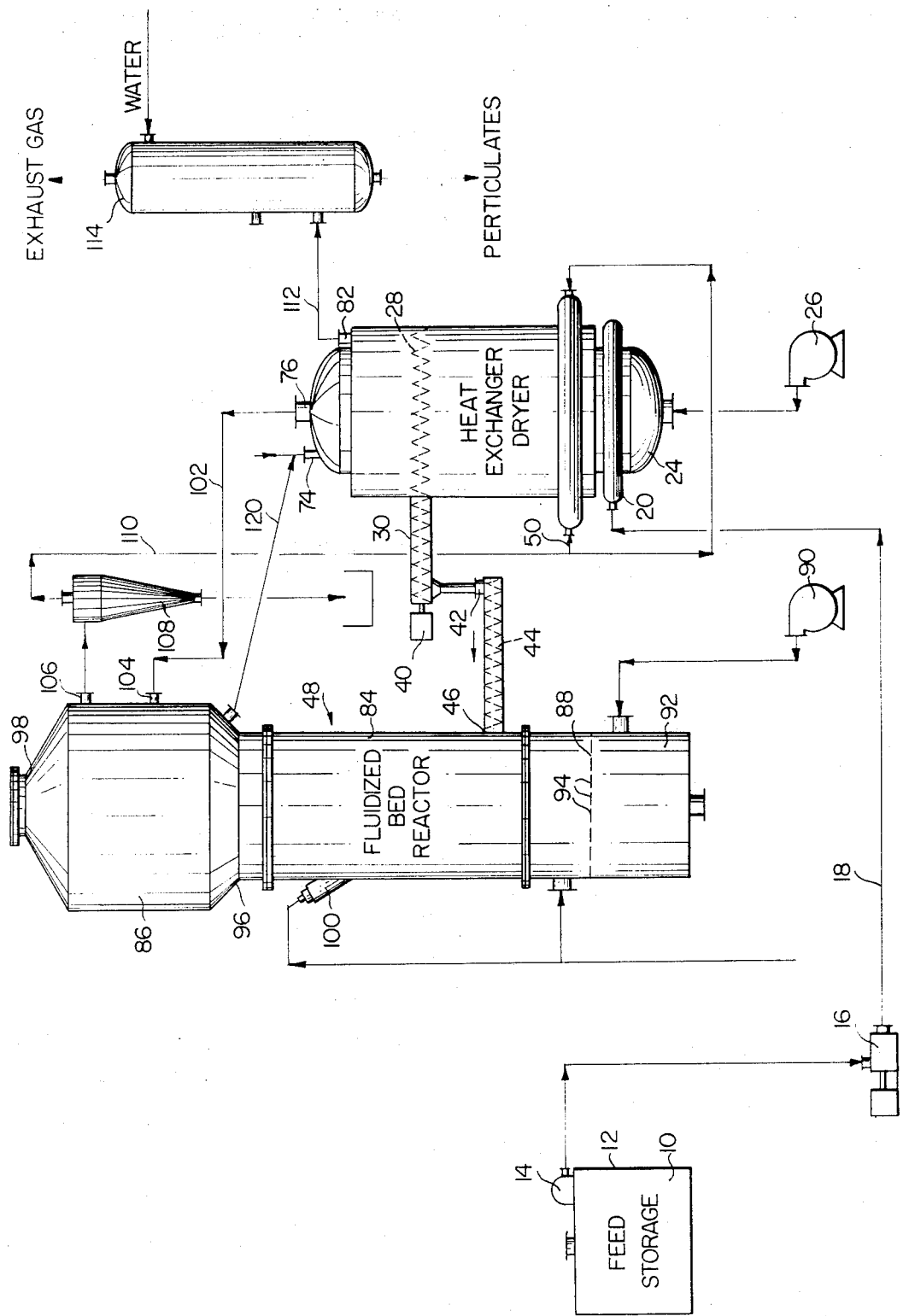
FIG. 1 is a schematic diagram illustrating the heat exchange system of this invention in which the reactor employed is an incinerator.
Figure 2:
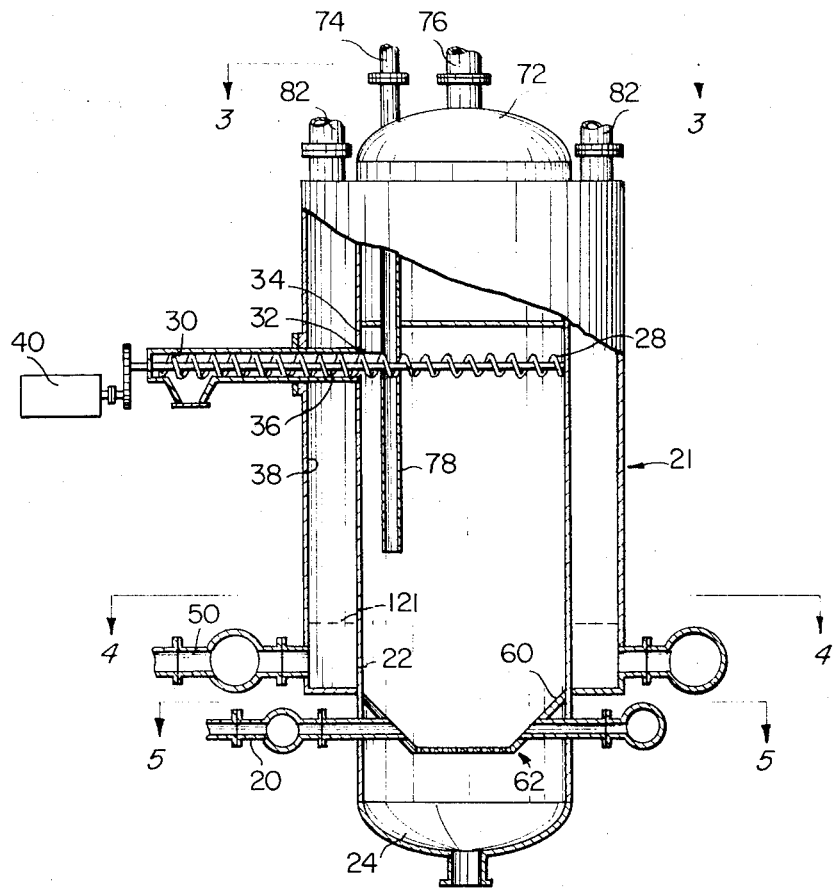
FIG. 2 is a side view of the fluidized bed heat exchanger dryer illustrated in FIG. 1, partly broken away and partly in section.
Figure 3:
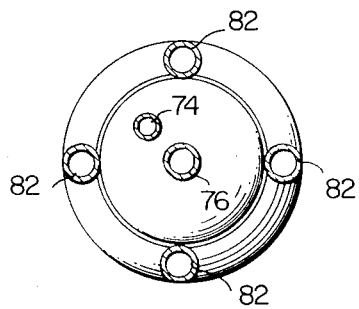
FIG. 3 is a view taken along line 3—3 of FIG. 2 illustrating various outlets from the heat exchanger-dryer.

Referring now to FIG. 1, a slurry feed 10 is held in storage bin 12. The feed is transferred through bin conveyor 14 to the slurry transfer pump 16. The slurry feed is pumped through line 18 into dryer manifold 20. The slurry feed passes from manifold 20 directly into the base of drying chamber 22 of dryer 21, illustrated in FIGS. 2 and 5. The slurry feed is contacted with hot fluidized solids, such as sand, aluminum oxide, etc., in drying chamber 22. Fluidizing gas, usually air, is forced into the base 24 of the drying chamber 22 by blower 26. As the slurry feed is heated in drying chamber 22 water and volatile constituents in the feed are vaporized and the solids in the feed are slowly lifted by the buoyancy forces and the flow of fluidizing gas to the discharge level 28 of the drying chamber 22.

The vaporized gas from drying chamber 22 may be discharged through exhaust opening 76 and line 102 into the incinerator 48 more fully described hereinafter. Line 102 feeds this vaporized stream into the top of the incinerator only when the material being dried contains odorous volatiles. In the incinerator, the vaporized gas is heated to above 1200°F and thereby deodorized. If the material being dried and incinerated is not odorous, line 102 may simply go to the atmosphere.

A first solids screw conveyor 30 extends across the diameter of the dryer and passes through an opening 32 in the side wall 34 of the drying chamber 22 and through a conduit 36 in heating jacket 38 to the exterior of the heat-exchanger dryer. A drive means 40 is employed to impart rotation to the solids screw conveyor 30. The dried solids removed from drying chamber 22 are discharged into a solids receiver 42. A second conveyor screw 44 extends from the solids receiver 42 to the inlet 46 of reactor 48. Reactor 48 is principally operated as an incinerator, and while not being limited thereto is referred to as an incinerator hereinafter.

Figure 4:
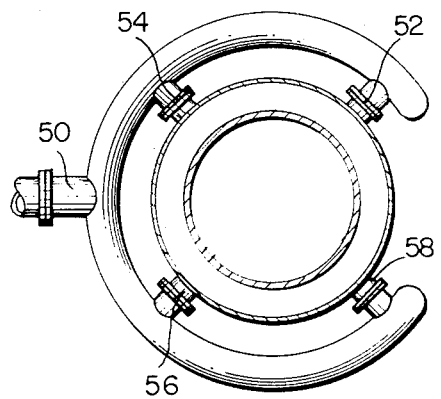
FIG. 4 is a view taken along line 4—4 of FIG. 2 illustrating the flue gas inlet to the heating jacket of the heat exchanger-dryer.

The dryer is more completely described with reference to FIGS. 2, 3, 4 and 5. As clearly shown in FIG. 2, the dryer is comprised of an inner vertical cylindrical drying chamber 22 which is surrounded throughout a substantial portion of its length by a cylindrical heating jacket 38. At the base of the heating jacket 38 is gas manifold 50 which distributes gas to the base of the heating jacket through inlets 52, 54, 56 and 58 as shown in FIG. 4. A gas distributor plate 121 may extend across the heating jacket at the base of jacket and directly above the gas inlets 52, 54, 56 and 58. The distributor plate may be eliminated if desired; the use of a distributor plate provides more efficient fluidizing, but has a greater chance of plugging.

Figure 5:
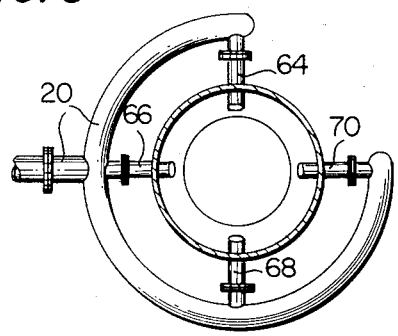
FIG. 5 is a view taken along line 5—5 of FIG. 2 illustrating the slurry feed inlet to the heat exchanger-dryer.

The combustible waste slurry is fed to feed inlets in the sloping side walls 60 of dryer distributor plate 62 through feed manifold 20. The slurry is distributed about the distributor plate through feed inlets 64, 66, 68 and 70 as shown in FIG. 5. Instead of the sloping side wall distributor plate shown in FIG. 2 fed by a plurality of inlets, a flat distributor plate fed by one or more slurry inlet ports may be used.

The top of inner vertical cylindrical drying chamber 22 is capped with a convex head 72 which has a fluidized solids return inlet 74 and an exhaust port 76 communicating the drying chamber to the exterior of said dryer. The fluidized solids return inlet 74 communicates with a conduit 120 (FIG. 1) which extends from the upper portion of the incinerator 48. A down pipe 78 extends downwardly from said fluidized solids return inlet 74 into drying chamber 22 to the area of said chamber below the discharge screw 30.

At the upper end of heating jacket 38 are a number of gas outlets 82. The arrangement illustrating the various outlets and inlets on the upper-end of dryer 21 is further described in FIG. 3.

Referring again to FIG. 1, it is seen that a preferred incinerator 48 is comprised of a vertical cylindrical incinerator body 84 and an incinerator head 86 extending directly above incinerator body 84. The incinerator 48 is adapted to be operated as a fluidized bed incinerator. Incinerator head 86 has a larger diameter than incinerator body 84 to permit reduction in fluid gas velocity thereby providing a vapor disengagement section for the incinerator. A gas distributor plate 88 extends across the entire cross-sectional area of incinerator body 84 near the bottom thereof. The incinerator 48 is equipped with an air blower 90 which pressurizes a plenum chamber 92 directly below distributor plate 88. The pressurized air passes through a multiplicity of openings 94 in distributor plate 88 fluidizing the fluid bed medium (not shown) employed. This air also provides the necessary oxygen for burning of the dried waste material.

The portion of the incinerator body 84 extending from distributor plate 88 to the base 96 of incinerator head 86 is referred to as the incineration or reaction section. The portion of the incinerator extending from the base 96 of incinerator head 86 to the top 98 of said head is referred to as the vapor disengaging section. Fluidizable solids may be returned to the drying chamber from the lower portion of the vapor disengaging section through conduit 120.

OPERATION OF THE HEAT-EXCHANGE SYSTEM

In operation, dried combustible waste feed from dryer 21 is fed into incinerator 48 in which the feed is contacted with the hot fluidized bed particles and air. The solids in the feed are ignited by burner 100 and are burned. The gases of combustion pass upwardly into the vapor disengaging section of incinerator 48. Vapors resulting from the drying of the slurry feed in dryer 21 may be also transferred through line 102 and gas inlet 104 into incinerator head 86. The combined gaseous stream (off gas) is withdrawn from incinerator 48 through gas outlet 106 and into a cyclone type separator 108. Uncombustible feed solids and a small amount of fluidized bed particles are separated from the gas in separator 108. The separated off gases are forced through line 110 to the inlet of the gas manifold 50 of dryer heating jacket 38. These hot off gases are employed to fluidize fluid bed heat transfer material (not shown) supported within said heating jacket. The gases pass through the heating jacket and are then discharged through gas outlet 82 and line 112 to a water scrubber 114 in which particulates and water soluble contaminants are removed. Substantially pollutant free air is then exhausted to the atmosphere.

In the system heretofore described, the hot off gases resulting from incineration of combustible waste solids are used to fluidize heat transfer material in the heating jacket of the dryer. The cross-sectional area of the heating jacket must be sized so that the incinerator off gas is sufficient to form a well agitated fluidized solids bed. Typically 0.5 to 1.5 ft/sec superficial velocity of gas in the jacket is suitable. A high heat transfer coefficient results between the wall of the fluidized bed heating jacket and the wall of the fluidized bed drying chamber.

The system of this invention can result in a heat transfer coefficient of about 50 BTU/HR-FT.$^2$—°F. on each side of the drying chamber wall (assuming the fluidized bed in the dryer is well agitated). The heat transfer system of this invention also eliminates heat exchanger fouling because of the lower temperature at the heated walls of drying chamber, as a result of increased heat transfer, and reduced contact of the solids being dried with the heat exchange wall. Another advantage to the process of this invention is that odorous volatiles can be deorodized by afterburning in the vapor disengaging section of the incinerator and made substantially odor-free before being discharged into the atmosphere.

The operating temperature of the fluidized bed dryer for drying waste feeds containing high water concentrations, i.e., up to about 90 percent water is 212°F. Air is provided to the fluid bed dryer from a blower in an amount to maintain a state of minimum fluidization (about 0.5 ft./sec. superficial vapor velocity) in the bed of the dryer without the presence of waste feed. This fluidization level insures that the waste feed material can be pumped into the drying chamber without difficulty. Vaporization of water and volatile constituents in the waste feed provides additional fluidizing gas and results in a well agitated fluidized solids bed (about 2 ft./sec. superficial vapor velocity is desirable).

In actual tests performed on drying of a paunch manure feed containing about 82 percent by weight water, steam, air and other gases are discharged from the dryer exhaust and piped to the vapor disengagement section of an incinerator, where these gases are combined with the incinerator combustion gases which are at elevated temperature on the order of about 1,500°F. The combined off gas equilibrates to a temperature of about 1,350°F. The off gas enters the base of the heating jacket at about 1,350°F. and is discharged from the heating jacket at about 700°F. The water content of the slurry is reduced by about 60 percent. The cooled off gas is piped to a water scrubbing system for removal of particulates and soluble contaminants and discharged to the atmosphere.

The heat exchange system of this invention has been described with reference to incineration of dried waste material in a fluidized bed incinerator. While the combination of apparatus disclosed is believed to be optimum, the system and process of this invention can be achieved employing several modifications. Thus, for example, the dried solids feed can be pyrolyzed or reacted in a raking arm type furnace or by external heating of the reactor in which pyrolysis is to take place. The hot gases and steam resulting from pyrolysis can be employed to be heat exchanged with a fluid bed material in the jacket of the dryer heretofore previously described. The system can also be operated by partially pyrolyzing or partially incinerating dried solids feed in a reactor which is substantially the incinerator heretofore described with the exception that a controlled oxidation is permitted to take place rather than substantially complete combustion.

In the broadest aspect then, dried waste materials are reacted in a reactor producing off gases which are subsequently heat exchanged with inert bed material contained within the heating jacket of a fluidized bed dryer contiguous with the drying chamber of said dryer.

In the system described heretofore, the equipment is designed for use with a waste feed slurry or sludge containing solids which are less dense than the fluidized bed in both the drying chamber of the dryer and the reactor. By simple adjustment of feed inlets and outlets, the system of this invention can be employed to dry a waste feed slurry or sludge containing solids which are more dense than the fluidized beds in the dryer and reactor. For example, a waste slurry feed containing solid more dense than the fluid bed would be fed into the top of the drying chamber and dried solids would be removed from the bottom of the drying chamber via a screw conveyor or rotary lock. In the reactor, the denser solids would be fed into the reactor at a similar location as for low density feeds. In the incinerator, the solids are burned or pyrolyzed to gases which rise through the fluid bed incinerator.

What is claimed is:

1. A heat exchange system comprising in combination:
   a. a fluid bed dryer having a drying chamber and a heating jacket contiguous with said drying chamber, said drying chamber and heating jacket each adapted to contain a bed of fluidizable particulate heat transfer material and each having a fluidizing gas inlet and an exhaust gas outlet, said drying chamber having a feed inlet and feed outlet,
   b. means for conveying a slurry comprising liquid and combustible waste solids to said feed inlet of the chamber of said fluid bed dryer,
   c. a reactor having a feed inlet, a reaction section, and a vapor exhaust port,
   d. conveyor means for transferring solids from the feed outlet of the drying chamber of said fluid bed dryer to the feed inlet of said reactor,
   e. conduit means connecting the vapor exhaust port of said reactor to said fluidizing gas inlet of the heating jacket of the fluid bed dryer, and
   f. means for providing fluidizing gas to said fluidizing gas inlet of the drying chamber of said fluid bed dryer.

2. The heat exchange system of claim 1 in which the fluid bed dryer has a vertical cylindrical drying chamber and the heating jacket comprises a cylindrical chamber surrounding said drying chamber.

3. The heat exchange system of claim 2 in which the reactor has a burner extending into the reaction section to ignite waste solids feed to the reactor to effect incineration thereof.

4. The heat exchange system of claim 2 in which the conveyor means comprises a first conveyor screw in communication with the feed outlet of the drying chamber, said first conveyor screw having a feed inlet end extending through the heating jacket and into the drying chamber of the fluid bed dryer and a discharge end, a dried solids received in communication with the discharge end of the first conveyor screw, a second conveyor screw having a feed inlet end in communication with the dried solids receiver and a feed discharge end in communication with the reactor feed inlet, and drive means connected to said first and second screw conveyors to impart, upon actuation thereof, rotation to said first and second conveyors to effect movement of solids from the dryer to the reactor.

5. The heat exchange system of claim 3 in which the conveyor means comprises a first conveyor screw in communication with the feed outlet of the drying chamber, said first conveyor screw having a feed inlet end extending through the heating jacket and into the drying chamber of the fluid bed dryer and a discharge end, a dried solids receiver in communication with the discharge end of the first conveyor screw, a second conveyor screw having a feed inlet end in communication with the dried solids receiver and a feed discharge end in communication with the reactor feed inlet, and drive means connected to said first and second screw conveyors to impart, upon actuation thereof, rotation to said first and second conveyors to effect movment of solids from the dryer to the reactor.

6. The heat exchange system of claim 1 which includes conduit means communicatively connecting the gas outlet of the drying chamber of the fluid bed dryer with the reactor.

7. The heat exchange system of claim 1 in which said reactor is a fluidized bed reactor having a fluidizing gas inlet, a vapor disengagement section directly above and in communication with said reaction section, and means for providing fluidizing gas to said fluidizing gas inlet of said reactor.

8. The heat exchange system of claim 7 in which the reactor has a burner extending into the reaction section to ignite waste solids feed to the reactor to effect incineration thereof.

9. The heat exchange system of claim 7 in which the conveyor means comprises a first conveyor screw in communication with the feed outlet of the drying chamber, said first conveyor screw having a feed inlet end extending through the heating jacket and into the drying chamber of the fluid bed dryer and a discharge end, a dried solids receiver in communication with the discharge end of the first conveyor screw, a second conveyor screw having a feed inlet end in communication with the dried solids receiver and a feed discharge end in communication with the reactor feed inlet, and drive means connected to said first and second screw conveyors to impart, upon actuation thereof, rotation to said first and second conveyors to effect movement of solids from the dryer to the reactor.

10. The heat exchange system of claim 9 in which the fluid bed dryer has a vertical, cylindrical drying chamber and the heating jacket comprises a cylindrical chamber surrounding said drying chamber.

11. The heat exchange system of claim 7 in which a conduit means adapted to carry fluidizable solids extends from about the interface between the reaction section and the vapor disengagement section of the reactor into the drying chamber.

12. The heat exchange system of claim 7 which includes conduit means communicatively connecting the gas outlet of the drying chamber of the fluid bed dryer with the vapor disengagement section of the reactor.

13. A fluid bed dryer comprising a drying chamber and a heating jacket contiguous with said drying chamber, said drying chamber and said heating jacket each adapted to contain a bed of fluidizable particulate heat transfer material and each having a fluid gas inlet and an exhaust gas outlet, said drying chamber having a feed inlet and feed outlet, said feed outlet vertically spaced from said feed inlet, and a conveyor means extending from said feed outlet into the drying chamber for transferring dried solids from the drying chamber to said feed outlet.

14. The fluid bed dryer of claim 1 having a vertical cylindrical drying chamber and in which said heating jacket comprises a cylindrical chamber surrounding said drying chamber.

15. The fluid bed dryer of claim 13 in which said drying chamber contains a gas distributor plate positioned in the lower portion of said drying chamber, said plate being adapted to support a bed of fluidizable particulate heat transfer material.

* * * * *